United States Patent [19]

Kimball

[11] 4,330,454
[45] May 18, 1982

[54] STORABLE FLOWABLE POLYPROPYLENE ETHER URETHANE COMPOSITION

[75] Inventor: Michael E. Kimball, Ashland, Ohio

[73] Assignee: The Goodyear Tire & Rubber Company, Akron, Ohio

[21] Appl. No.: 251,637

[22] Filed: Apr. 6, 1981

[51] Int. Cl.³ .............................................. C08K 5/09
[52] U.S. Cl. .................................... 524/773; 528/61; 528/64; 524/871; 524/789; 524/775
[58] Field of Search .................... 260/31.8 M; 528/61, 528/64

[56] References Cited

U.S. PATENT DOCUMENTS 3,900,447  8/1975  Van Gulik ................ 260/77.5 AM
4,247,676  1/1981  Kimball .................................. 528/49

Primary Examiner—Joseph L. Schofer
Assistant Examiner—Bernard Lipman
Attorney, Agent, or Firm—J. D. Wolfe

[57] ABSTRACT

A storable flowable polypropylene ether urethane composition having relatively long shelf life at room temperature, readily curing at elevated temperatures to a solid composition and providing a more economic and lower viscosity flowable storable composition useful as gel coats and adhesives.

9 Claims, No Drawings

STORABLE FLOWABLE POLYPROPYLENE ETHER URETHANE COMPOSITION

TECHNICAL FIELD

This invention relates to a storable flowable polypropylene ether urethane composition having relatively long shelf life at room temperature but readily cures at elevated temperatures to a solid composition. More particularly this invention relates to a more economic and lower viscosity flowable storable composition useful as gel coats and adhesives.

BACKGROUND ART

It is well known that polyurethane prepolymers are readily cured with alkali metal salt complexes of 4,4'-methylene dianiline type. The nature of these complexes and their processes of preparation and use are described in such U.S. Pat. Nos. as 3,755,261, 3,876,604 and 4,029,730 and generally may be expressed in the following manner.

The polyurethanes are generally formed by first reacting a polyether polyol or a polyester polyol with a molar excess of an organic diisocyanate to form a prepolymer having terminal isocyanato groups. The prepolymer is then cured to increase its molecular weight from less than about 3000 to upwards of about 10,000. Examples of such polymers are described in U.S. Pat. Nos. 2,620,516, 2,777,831, 2,843,568, 2,866,774, 2,900,368, 2,929,800, 2,948,691, 2,948,707 and 3,114,735, herein incorporated by reference.

Prior to the curing operation itself, mixing and/or milling of the polyurethane with finely divided particles of of the complex is required. Typically the complex particle size is 1 to 150 microns, preferably 2 to 20 microns. Grinding of the complex can be accomplished in standard grinding equipment such as the fluid energy mill and verticle hammer mills employing air classification to remove ground material from the mill.

Mixing of the finely divided complex with liquid prepolymers can be accomplished in dough mixers, high speed impeller mixers, paddle type mixers and the like. For best results it is preferred that the mix found in the foregoing types of mixers be further mixed (or the complex dispersed) by use of a three-roll mill such as is used in paint and ink manufacture. Improved dispersions can also be prepared in colloid mills. These various types of mixers and mills are described in "The Encyclopedia of Chemical Process Equipment", W. J. Mean, Reinhold (1964).

In the use of a solid type polyurethane prepolymer or gum which is to be cured the complex may be dispersed on a rubber mill or in an internal mixer (a Banbury Mixer). Once the gum has been banded on the mill or broken down in the internal mixer the finely ground complex can be added directly and milling or mixing continued until a uniform dispersion has been prepared.

In mixing the complex with either fluid prepolymers or millable gums the temperature must be kept below the decomposition point of the complex in order to avoid the possibility of premature curing. In the present process the decomposition point of the complex is a function of the particular complex being used and the polymer in which the complex is dispersed. For isocyanato terminated urethane prepolymers and the sodium chloride complex of methylene dianiline, mixing should be performed below 80° C. and preferably below about 50° C.

The temperature to be utilized during the curing of urethanes will be about 90° to 180° C. Temperature is not particularly critical but it must be above the temperature at which the complex dissociates in the system being cured. This temperature will also vary with each particular complex. The complex between sodium chloride and 4,4'-methylene dianiline begins to dissociate at about 90° C. in a urethane system.

Full curing will ordinarily take about 1 minute to 24 hours depending on the temperature for urethanes when utilizing MDA/sodium chloride complex. Preferred curing conditions range from ½ to 12 hours at temperatures ranging from about 100° to 150° C. At these preferred curing temperatures sufficient cure to permit demolding occurs within about 5 seconds to 5 minutes because of the high reactivity of the MDA.

Also the Norman Martin Van Gulick U.S. Pat. No. 3,900,447, issued Aug. 19, 1975, entitled "Thermally Activated Promoters for Salt Complex Curing Agents" discloses isocyanate terminated urethane polymers are cured effectively by heating with a complex of 4,4-methylene dianiline (MDA) and selected alkali metal salts and a urea channel inclusion complex comprised of the host, urea and he guest, solvents.

This patent further discloses that even comingling the MDA salt complex with the urethane prepolymer and urea, as an accelerator in a one can system, the shelf life of such a system will be reduced because of the presence of the urea, as the urea will cause the cure to occur at a significant rate at temperatures as low as 40° C. Hence the presence of the urea as an accelerator renders the system nonstorable.

U.S. Application Ser. No. 066,153, filed Aug. 13, 1979 by Michael E, Kimball, entitled "Storable Flowable Polyurethane Adhesive Compositions" now U.S. Pat. No. 4,247,676, discloses how to make storable polyurethane compositions with MDA salt complex curative and a polyurethane prepolymer with the liquid material having 2 to 5 hydroxyls reactive with the specifically useful organic polyisocyanates to form the prepolymer, said liquid material being characterized by the ability to dissolve at 80° C. more than 0.13 gram of a 50/50 mixture of sodium chloride-4,4'-diphenylene diamine complex, i.e. MDI:3NaCl, and tetraethylene di(2-ethyl hexoate) in 100 grams of said material.

These storable flowable polyurethane adhesive compositions are very satisfactory for fabrication of molded fiberglass resin products. Polypropylene ether glycol does not exhibit this desired solubility and thus does not yield storable flowable polyurethane compositions with the prior taught procedures.

DISCLOSURE AND PRACTICE OF THE INVENTION

Applicant has discovered that, contrary to the teachings of the prior art, a storable flowable polypropylene ether urethane composition can be produced with polypropylene ether glycol isocyanate prepolymer, an MDA salt complex and urea. This invention provides a polypropylene ether urethane composition containing a polypropylene ether prepolymer, a curative of the MDA salt complex type and urea as an accelerator that is room temperature storable for months yet can be cured readily at elevated temperatures. Hence this storage stability obtainable with this composition is contrary to the teachings of the prior art. Further, this invention provides a lower viscosity and a lower cost adhesive whose cure characteristics appear to be sufficiently low to give satisfactory cures and physical properties at economic cure temperatures but resist cure at those temperatures which are encountered at ambient conditions of storage.

The storable flowable polypropylene ether polyurethane compositions of this invention comprise an equivalent of a prepolymer formed by reacting a polypropylene ether glycol of 500 to 6500 and preferably about 900 to 4500 molecular weight with sufficient organic polyisocyanate to yield a prepolymer having about 3 to 15 percent and preferably 5 to 10 percent by weight of free NCO with the proviso that the free NCO be unreacted isocyanate of methane di(phenyl isocyanate), 0.7 to 1.05 equivalents of a metal salt complex of an alkali metal salt with 4,4'-diphenyl methane dianiline, said alkali metal being selected from the class consisting of sodium, potassium and lithium and preferably from the anions of chloride and bromide and about 0.5 to 5 percent by weight of urea having particle sizes that will pass a 500 Standard U.S. Sieve with said particle sizes including dispersions of urea in an MDA metal salt complex solvent.

The prepolymer is prepared preferably by reacting a polyol with sufficient MDI to yield a prepolymer having its free NCO derived from unreacted isocyanate groups of MDI. A less preferred method is to react the polyol with an organic polyisocyanate, i.e. toluene diisocyanate or polyaryl methane polyisocyanate, where the aryl group is preferably phenyl, to give a hydroxyl terminated prepolymer and then react the hydroxyl terminated prepolymer with sufficient methane di(phenyl isocyanate) to produce a prepolymer containing about 3 to 15 percent and preferably 5 to 10 percent free NCO. This less preferred method permits the less expensive organic polyisocyanates to be used to replace part of the MDI.

The prepolymer is made by reacting the polypropylene ether glycol in a heated, stirred reduced pressure reactor by reacting the polyol with the organic polyisocyanate with provisions being taken to see the free NCO present is unreacted isocyanate groups of methane di(phenyl isocyanate).

The metal salt complex of 4,4'-diphenyl methane dianiline may be dispersed in liquid polyesters such as polytetramethylene ethers of the dicarboxylic acids of 6 to about 12 carbon atoms and the dialkyl phthalates where the alkyl radical has about 6 to 12 carbon atoms. Particularly preferred solvents for dispersion of the metal salt complex are di-2-ethylhexyl phthalate and the related diocty phthalate and the polytetramethylene adipates.

The urea is used in very fine particle sizes that will pass a 550 Standard U.S. Sieve and is prepared in these sizes by either grinding or dispersing in a solvent, such as the polyesters used to disperse the metal complex to obtain the desired particle sizes. Where the urea is dispersed in a solvent such as dioctyl phthalate and polytetramethylene adipate, or related polyesters, it is desirable to use a small amount, 0.1 to 2 percent, of a surfactant such as propoxylated quaternary ammonium chloride to prevent the dispersion from settling. It should be understood the phrase "pass a 550 Standard U.S. Sieve" includes these urea dispersions.

The nature and advantage of this invention can be seen more readily and appreciated by reference to the following representative examples where all parts and percentages are by weight unless otherwise indicated.

EXAMPLE

Prepolymers were made using the recipe of Table I by placing the polypropylene ether glycol in the reactor, then adding the talc and flake MDI and reacting to give prepolymers having 7.45 percent free NCO content.

The urea was added to the dispersion of the metal complex and dispersed therein before being added to the prepolymer at a temperature preferably of 25° C. or lower to form the adhesive or gel coat material.

These adhesives prepared by the recipes of Table I were used to bond standard polyester fiberglass specimens (SCM) by casting the adhesive on the SCM specimens, laminating and curing at the temperature and time indicated in Table I.

TABLE I

| Ingredient | Recipe 1 | Recipe 2 | Recipe 3 |
|---|---|---|---|
| Polypropylene ether glycol 2000 molecular weight | 200 | 200 | 200 |
| Talc | 200 | 200 | 200 |
| Flake MDI | 140 | 140 | 140 |
| NCO % Found | 7.45% | 7.45% | 7.45% |
| Metal Complex* | 200 | 200 | 200 |
| Urea | 0 | 7.5 | 15 |
| Cure/Time | | | |
| 100° C./20 minutes | No cure | Almost cure** | Cure |
| 121° C./20 minutes | No cure | Cure | Cure |
| 148° C./10 minutes | No cure | Cure | Cure |
| Shelf Life 25° C. | 1 month | >1 month | >1 month |

*A metal complex of 4,4'-diphenyl methane dianiline and sodium chloride dispersed in polytetramethylene adipate.
**A cure is obtained in a reasonable time if the heat treatment is extended where Recipe 1 adhesive, gives no cure.

When the cure results of the adhesives made by the recipes of Table I are compared it is evident that urea effects a cure at 100° C. in a reasonable time with the recipe of this invention. Further the invention adhesives are storage stable for several months whereas Van Gulick teaches urea makes the system nonstorable.

A hydroxyl terminated prepolymer was prepared by placing a polypropylene ether glycol of about 1000 molecular weight and the talc in the reactor and then reacting with sufficient toluene diisocyanate to leave about 10 percent unreacted hydroxyls. Then sufficient methane di(phenyl isocyanate) was added and was reacted to give a prepolymer having 6.5 percent free NCO. This prepolymer may be used in Recipes 2 or 3 to give a storable composition that can be cured by heating.

While certain representative embodiments and details have been shown for the purpose of illustrating the invention it will be apparent to those skilled in this art that various changes and modifications may be made therein without departing from the spirit or scope of the invention.

I claim:
1. A storable flowable polypropylene ether polyurethane composition comprising a mixture of
  (A) an equivalent of a prepolymer formed by reacting polypropylene ether glycol with sufficient organic polyisocyanate to give an excess of about 3 to 15 percent by weight of free NCO in said prepolymer with the proviso that the free NCO is obtained from methane di(phenyl isocyanate);

(B) 0.7 to 1.05 equivalents of a complex of an alkali metal salt with 4,4'-diphenyl methane dianiline, said alkali metal being selected from the class consisting of sodium, potassium and lithium; and (C) 0.5 to 5.0 percent by weight of urea having a particle size that will pass a 550 Standard U.S. Sieve.

2. The polyurethane composition of claim 1 wherein the isocyanate is a methane di(phenyl isocyanate).

3. The polyurethane composition of claim 1 wherein the polypropylene ether glycol has a molecular weight of about 900 to 4500.

4. The polyurethane composition of claim 1 containing a small amount to about 50 parts of silicate filler per 100 parts of the polyurethane composition.

5. The polyurethane composition of claim 4 wherein the silicate filler is talc.

6. The polyurethane composition of claim 1 wherein the complex is dispersed in a solvent selected from the class consisting of polytetramethylene ester of the dicarboxylic acids of 6 to 12 carbon atoms and dialkyl phthalate where the alkyl radical contains from 6 to 12 carbon atoms.

7. The polyurethane composition of claim 1 wherein the complex is dispersed in a solvent selected from the class consisting of polytetramethylene adipate and dioctyl phthalate.

8. The polyurethane composition of claim 1 wherein the free NCO is about 5 to 10 percent.

9. The polyurethane composition of claim 1 wherein the organic polyisocyanate is methane di(phenyl isocyanate).

* * * * *